United States Patent [19]

Kamen et al.

[11] Patent Number: 5,667,856

[45] Date of Patent: Sep. 16, 1997

[54] RADIATION CURABLE PIGMENTED COMPOSITIONS AND DECORATED SUBSTRATES

[75] Inventors: Melvin Edwin Kamen, Highlands; Bhupendra Patel, Edison, both of N.J.

[73] Assignee: Revlon Consumer Products Corporation, New York, N.Y.

[21] Appl. No.: 348,406

[22] Filed: Dec. 2, 1994

Related U.S. Application Data

[60] Division of Ser. No. 199,414, Feb. 22, 1994, Pat. No. 5,571,359, which is a continuation-in-part of Ser. No. 824,968, Jan. 24, 1992, abandoned.

[51] Int. Cl.$^6$ ............................. B32B 27/40; C09D 11/02
[52] U.S. Cl. ..................... 428/34.6; 428/34.7; 525/163; 525/123; 106/493; 522/96
[58] Field of Search .................... 525/162, 163, 525/123, 178, 183, 208, 450, 451; 106/493; 522/96; 428/34.6, 34.7

[56] References Cited

U.S. PATENT DOCUMENTS

| | | | |
|---|---|---|---|
| 2,890,197 | 6/1959 | Phillips | 385/143 |
| 3,027,357 | 3/1962 | Stickle | 117/57 |
| 3,867,404 | 2/1975 | von der Crone | 548/460 |
| 3,884,955 | 5/1975 | von der Crone | 558/416 |
| 3,897,439 | 7/1975 | Frey | 548/108 |
| 3,994,851 | 11/1976 | Chang | 524/598 |
| 4,161,478 | 7/1979 | Crivello | 549/3 |
| 4,262,120 | 4/1981 | von der Crone | 558/416 |
| 4,400,507 | 8/1983 | von der Crone | 544/300 |
| 4,415,685 | 11/1983 | Iqbal | 524/92 |
| 4,552,604 | 11/1985 | Green | 156/246 |
| 4,579,949 | 4/1986 | Rochat | 546/167 |
| 4,585,878 | 4/1986 | Jost | 548/453 |
| 4,632,704 | 12/1986 | Babler | 106/498 |
| 4,666,455 | 5/1987 | Jost | 8/506 |
| 4,717,605 | 1/1988 | Urban | 428/1 |
| 4,783,540 | 11/1988 | Babler | 548/453 |
| 4,791,204 | 12/1988 | Jost | 546/101 |
| 4,847,329 | 7/1989 | Koleske et al. | 525/162 |
| 4,914,211 | 4/1990 | Jost | 548/453 |
| 4,977,199 | 12/1990 | Koleske | 525/162 |
| 4,978,768 | 12/1990 | von der Crone | 558/416 |
| 5,074,198 | 12/1991 | Babler | 106/493 |
| 5,074,918 | 12/1991 | Babler | 106/493 |
| 5,104,719 | 4/1992 | Kamen et al. | 428/195 |
| 5,178,952 | 1/1993 | Yamamoto et al. | 428/425.8 |
| 5,221,560 | 6/1993 | Perkins | 427/525 |
| 5,391,247 | 2/1995 | Kamen et al. | 156/233 |

FOREIGN PATENT DOCUMENTS

| | | |
|---|---|---|
| 106628 | 4/1984 | European Pat. Off. . |
| 106628 | 6/1984 | European Pat. Off. . |
| 139042 | 2/1985 | European Pat. Off. . |
| 233358 | 8/1987 | European Pat. Off. . |
| 57-152992 | 9/1982 | Japan . |
| 59-184746 | 4/1983 | Japan . |
| 63-017075 | 1/1988 | Japan . |

OTHER PUBLICATIONS

Cyralure Brochure, Union Carbide, 1987.

*Primary Examiner*—Charles Nold
*Attorney, Agent, or Firm*—Julie Blackburn

[57] ABSTRACT

A pigmented ink composition comprising a radiation curable component and a pyrrolopyrrol or isoindolinone pigment; a method for decorating a substrate with the pigmented ink compositions; and a method for decorating a substrate with hot stamping foil and the pigmented ink compositions.

20 Claims, No Drawings

RADIATION CURABLE PIGMENTED COMPOSITIONS AND DECORATED SUBSTRATES

This is a divisional of application(s) Ser. No. 199,414, filed Feb. 22, 1994, U.S. Pat. No. 5,571,359, which is a continuation-in-part of U.S. patent application Ser. No. 824,968 filed Jan. 24, 1992, now abandoned.

TECHNICAL FIELD

The invention is in the field of radiation curable ink compositions.

SUMMARY OF THE INVENTION

Commercial ceramic and glassware is often decorated by applying a pattern in colored ink on the surface of the substrate with screen printing, offset printing, or any other direct application technique. The decorated substrate is then fired to burn off the organic components of the ink and cause the pattern to fuse to the glass. This process is time and energy intensive, resulting in expensive operational costs and requirements for significant floor space in factories. Also, prior to firing, the applied decoration is extremely prone to damage caused by the rubbing and scratching that occurs in normal handling operations, which results in many rejects.

Radiation curable adhesives are known in the art, and offer a significant advantage over other types of inks because radiation curing is easy and inexpensive, requiring only lamps which emit the desired wavelength of light, or in the case where no photopolymerization agent is used, electron beam, neither of which require much floor space. In addition, the hazards and energy expenditures found with ovens are totally eliminated. One of the major drawbacks of radiation curable links is that the addition of heavy metal pigments like cadmium, chromium, manganese, etc., to the ink composition will interfere with the radiation curing. In particular, red and yellow pigments absorb light at the same wavelength as ultraviolet light (4 to 400 nm.) or actinic radiation (200–600 nm.). Further, cadmium and chromium in particular are coming under increasing scrutiny due to environmental concerns about heavy metals, so it is becoming less desireable to use them for decorating purposes. Further, inks colored with inorganic pigments often exhibit poor coloration (i.e. reds often look brown or purple) and are not acceptable for commercial decorating purposes.

Thus, there is a need for radiation curable inks which cure easily, have a bright, legible red and yellow color acceptable for commercial decoration, and are free from environmental concerns.

SUMMARY OF THE INVENTION

The invention is directed to a pigmented ink composition comprising:

a) a radiation curable component which, when applied directly to a substrate, is operable, when cured, to bond to the substrate; and b) a pigment selected from the group consisting of pyrrolopyrrol, isoindolinone, and mixtures thereof.

The invention is also directed to a method for applying a colored decoration to a substrate, comprising:

a) applying a pigmented ink composition comprising a radiation curable component and a pigment selected from the group consisting of pyrrolopyrrol, isoindolinone, and mixtures thereof, to the substrate in a predetermined design said ink being operable when cured to bond to the substrate, b) curing the ink on the substrate by exposing it to the radiation by which it is curable thereby bonding the ink to the substrate.

The invention is also directed to a method for decorating a substrate with colored ink and hot stamping foil comprising:

a) applying a pigmented ink composition comprising a radiation curable component and a pigment selected from the group consisting of pyrrolopyrrol, isoindolinone, and mixtures thereof, to the substrate in a predetermined design, said ink being operable when cured to bond to the substrate, b) curing the ink on the substrate by exposing it to the radiation by which it is curable thereby bonding the ink to the substrate, c) pressing a sheet of hot stamping foil against the substrate with a die heated to a temperature sufficient to cause a potion of the foil to adhere to the heated, cured ink design but not to the ink-free areas of the substrate, and d) removing the die thereby leaving behind a potion of the foil adhered to the ink design.

DETAILED DESCRIPTION

The invention is based upon the discovery that organic pigments such as pyrrolopyrrols and isoindolinone pigments (red and yellow respectively) can be incorporated into radiation curable compositions used for decorating purposes to provide red and yellow colors which are bright, true, adhere well to the substrate and are easily curable directly on the substrate. A substrate may be glass, plastic, ceramic, and may comprise containers such as bottles, cups, dishes, glasses, vases, figurines, other decorative glassware, glass or ceramic sheets, tiles and so on.

The radiation curable composition contains a radiation curable component which may be monomers, oligomers, or low molecular weight homopolymers, copolymers, terpolymers, graft copolymers or block copolymers, so long as the component is cured (polymerized) by exposure to electron beam or actinic or ultraviolet radiation. The radiation curable component must be capable, after curing, to bind to the substrate to which it is applied to a degree sufficient to be commercially acceptable for decorating purposes. This means that the ink must be permanently affixed to the substrate to a degree sufficient to remain on the substrate for the useful life of the substrate. For example, where the substrate is a container containing nail enamel, the ink must remain on the container throughout the useful life of the nail enamel and remain resistant to the solvents and other ingredients found in nail enamel. In the preferred embodiment of the invention, the radiation curable component is curable by ultraviolet (UV) radiation having the wavelength of 4 to 400, preferably 325 to 365 nm.

Suitable monomers include epoxides, cycloaliphatic epoxides, vinyl chloride, styrene, ethyl acrylate, vinyl acetate, difunctional acrylic monomers such as hydroxy alkyl acrylates or hydroxy alkyl methacrylates, vinyl butyrate, vinyl methyl ether, methyl methacrylate, isobornyl acrylate, acrylonitrile, or mixtures thereof.

Suitable polymers include oligomers, homo- or copolymers, terpolymers, graft copolymers of the above monomers provided they have a molecular weight of less than about 50,000, otherwise it is too difficult to effect polymerization.

Preferred are cationically UV cured epoxides having at least two epoxy groups per molecule as well as those which are polymeric such as the reaction products of epichlorohydrin and phenol or a phenolformaldehyde resin, diepoxy resin, epoxidized oils, and epoxidized polyolefins are preferred. Such epoxides include novolac epoxides, glycidyl ethers of various typos including diglycidyl ethers of bisphenol, diglycidyl ethers of butanediol, and the like. Also suitable are homopolymers and copolymers that contain pendant epoxide groups such as those made from glcidyl acrylate and or methacrylate with or without other ethylenically unsaturated. monomers e.g. vinyl chloride, vinyl acetate, styrene, hydroxyethyl acrylate, hydroxpropyl acrylate, and so on. Preferred are cationically UV cured cycloaliphatic epoxides including those set forth in U.S. Pat. Nos. 3,027,357, 3,890,194, 2,890,197, 3,031,434, 3,125,592, 3,201,360, and 5,204,930 all of which are hereby incorporated by reference, and in particular 3,4-epoxycyclohexylmethy-3,4-epoxycyclohexancarboxylatebis-(3,4-epoxy-cyclohexylmethyl)-adipate, vinylcyclohexene diepoxide, bis (2,3-epoxycyclophenyl)ether, epoxidized butadiene, 2,3-epoxy-2-methylcyclohexyl-methyl-3,4-epoxy-2-methylcyclohexane carboxylate, and so on.

The particularly preferred radiation curable components are cationically UV-cured cycloaliphatic epoxides sold under the Cyracure tradename by Union Carbide Chemicals and Plastics Company, Danbury, Conn., such as Cyracure UVR 6110, 6100, 6379, 6351, and 6200.

Generally the radiation curable component comprises about 10–95% by weight of the total composition, preferably 15–70%, more preferably 35–85%.

The radiation curable component may also contain ester containing polyols having a molecular weight of less than 850 and a viscosity of less than 60 poise. These ester containing polyols are prepared by methods well known in the esterification or alkyd resin art. Suitable polyols are disclosed in U.S. Pat. No. 3,994,851 which is hereby incorporated by reference. The polyols are the reaction product of polycarboxylic acids (such as adipic, azeleic, malic, fumaric, succinic, or glutaric acids) and a polyol (such as ethylene glycol, neopentyl glycol, diethylene glycol, trimethylolpropane monoallyl ether, 1,6-hexanediol, etc.). Polycaprolactone polyols sold under the tradename TONE Polyols by Union Carbide, particularly TONE Polyol 310 or trimethylolpropane caprolactone is preferred. About 1–20% by weight, preferably 3–15% of ester containing polyol is suggested.

When the radiation curable component is cured by UV or actinic radiation rather than electron beam, it is desireable to add a photoinitiator which catalyzes polymerization of the component upon exposure to the radiation to which the component is sensitive. The radiation curable component is always selected so as to be curable upon exposure to UV or actinic radiation even though the component may be cured by electron beam. If electron beam is used to cure the composition, it may be possible to dispense with a photoinitiator. Carbonyl compounds such as ketones and derivatives thereof are especially suitable; for example methyl ethyl ketone, benzophenone, benzyl dimethyl ketal, 1-hydroxycyclohexylphenylketone, 2,2-dimethoxy-2-phenylacetophenone, diethoxyacetophenone, and 2-methyl-1-(methylethiophenyl)-2-(4-morpholinyl)-1-propanone are excellent photoinitiators. Other photosensitive onium salts are particularly good UV activated photoinitiators. The use of photosensitive onium salts to promote cure of epoxides when exposed to UV radiation is described in U.S. Pat. Nos. 4,058,401, 4,138,255, 4,161,478, all of which are incorporated by reference herein. The photosensitive onium salts mentioned in these patents are good UV fight photoinitiators. Triaryl sulphonium salts are preferred, in particular a triaryl sulphonium salt sold by Union Carbide under the tradname Cyracure UVI 6974. If a photoinitiator is present, about 1–20%, preferably 3–15% by weight is suggested.

A defoaming agent may be added to the composition also. Defoamers cause the ink to apply smoothly on tho substrate without bubbles or uneveness. A wide variety of defoamers are suitable, but preferred are polyalkyl acrylics such as polyvinyl butyl ether in Stoddard solvent sold under the tradename BYK-052 and BYK-053 by Ciba-Geigy. Generally 1–20 %, preferably 3–15 % of a defoaming agent is suggested.

The radiation curable component may also include an adhesion promoter which is an agent that increases adhesion of the radiation curable component to the substrate. Substrates which can be decorated with the ink composition of the invention include glass, ceramics, plastic, tile, and so on. If the substrate is glass, silanes are excellent coupling agents with glass and will promote adhesion of the radiation curable component to the glass or ceramic substrate. Acryloxy-functional silanes as disclosed in U.S. Pat. No. 5,221,560, which is hereby incorporated by reference, are suitable. Such acryloxy-functional silanes include 3-methacryloxypropyltrimethyoxysilane, 3-acryloxypropyltrimethyoxysilane, 2-methacryloxyethyltrimethoxysilane, 2-acryloxyethyltrimethoxysilane, 3-methacryloxypropyltriethoxysilane, 3-acryloxypropyltrimethyoxysilane, 3-acryloxypropyltriethoxylsilane, 2-methacryloxyethyltriethoxysilane, 2-methacryloxyethyltriethoxysilane, 2-acryloxyethyltriethoxysilane, etc. Glycidoxy-functional silanes are also suitable. Glycidoxy silanes include 3-glycidoxypropyltrimethoxysilane, 2-glycidoxyethyltrimethoxysilane, 3-glycidoxypropyltriethoxysilane, 2-glycidoxyethyltriethoxysilane, 3-glycidoxypropyltrimethyl silane and so on. The glycidoxy silanes are preferred, in particular 3-glycidoxypropyltrimethyl silane. About 1–10% by weight of an adhesion promoter will cause improved adhesion of the composition to the substrate.

Other ingredients may be added to the radiation curable composition including stabilizers, inert fillers, wetting agents, leveling agents, and so on. If present, these ingredients comprise about 1–15% by weight of the total composition.

The pigments used to color the radiation curable composition are organic pigments from the pyrrolopyrrol and isoindolinone chemical families. The pyrrolopyrols are red, the isoindolinones are yellow. Suitable pyrrolopyrrols are as set forth in U.S. Pat. Nos. 4,415,685, 4,579,949, 4,791,204, 4,666,455, 5,074,918, 4,783,540, 4,632,704, 4,914,211, 4,585,878, all of which are incorporated herein by reference. These pyrrolo pyrrols are generally of the formula:

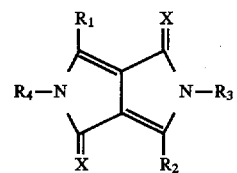

wherein $R_1$ and $R_2$ are each independently alkyl, arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl, phenyl, benzoyl, benzyl, arylalkyl, aryl, alkanoyl, $C_{5-6}$ cycloalkyl, alkenyl, alkynyl, carbamoyl, alkylcarbamoyl, arylcarbamoyl, or alkoxycarbonyl; and X is O or S.

Preferred is a compound wherein $R_1$ and $R_2$ are each independently phenyl or naphthyl, $R_3$ and $R_4$ are hydrogen, and X is O. Particularly preferred is pyrrolo 3,4-C pyrrol-1,4-dione, 2,5-dihydro-3,6-di-4-chlorophenyl which has a GAS number 84632-65-5 and is known by the common name C.I. pigment red 254. This pigment is commercially available from Ciba-Geigy Pigments Division, Newport Del. under the tradename Irgazin DPP Red 80. Other Ciba-Geigy red pigments sold under the tradename Irgazin are also suitable.

The yellow pigment is from the isoindolinone chemical family. Suitable isoindolinones are as set forth in U.S. Pat. Nos. 3,884,955, 3,867,404, 4,978,768, 4,400,507, 3,897,439, and 4,262,120, and 5,194,088, all of which are hereby incorporated by reference. Preferred isoindolinones are tetrachlorocyanobenzoic acid alkyl esters, particularly benzoic acid, 2,3,4,5-tetrachloro-6-cyano-, methyl ester which is reacted with 2-methyl-1,3-benzenediamine and sodium methoxide. This pigment composition has the common name G.I. Pigment Yellow 109 and is available commercially from Ciba-Geigy Pigments Division, Newport, Del. under the tradename Irgazin yellow 2GLTE. Other pigments in the Irgazin Yellow series as manufactured by Ciba-Geigy are also suitable.

The pigment component of the composition comprises about 1–50% by weight of the total composition, preferably about 15–35%. The red or yellow pigments may be used alone or mixed, as desired to achieve the appropriate shade. A particularly nice shade of red is achieved by using a mixture of 5–50%, preferably 10–40% red and 0.5–20%, preferably 1–12% yellow pigment.

The preferred pigmented ink composition of the invention comprises about 15–40% pigment and 55–85% of the radiation curable composition. In particular the composition comprises:

15–40% of an isoindolinone or pyrrolopyrrol pigment,

35–85 % radiation curable component, preferably a cationically UV cured cycloaliphatic epoxide, 3–15 % ester containing polyol.

Preferably the above composition additionally contains 3–15% by weight of a photoinitiator and/or 3–15% by weight of a defoaming agent.

If the pigmented ink composition is used to decorate glass or ceramics, about 1–10% of a silane may be added to enhance adhesion to the glass substrate.

The invention also comprises a method for decorating glass, plastic, or ceramic substrates by applying the ink composition of the invention to the substrate in a predetermined design and curing the ink by exposing it to UV or actinic radiation. Although the pigmented composition can be applied to the entire substrate surface, it is preferred that the predetermined design which is applied leaves some areas of the substrate ink-free. The ink is applied by a variety of methods including screen printing, offset printing, hand painting, and the like. After the ink is applied the substrate is irradiated with a light emitting UV or actinic radiation using a conventional UV light source. Electron beam may be used instead of a UV conveyer. The UV conveyer is set up so that the substrate passes through for an amount of time appropriate to completely cure the ink composition and cause it to adhere to the substrate. If desired, the substrate may be moved through the conveyer in one or more passes to achieve the required curing. The appropriate time varies depending on what the substrate is, but generally curing is accomplished in 1–30 minutes, more probably 3–25 minutes.

After the substrate emerges from the conveyer, the ink is completely cured and fused to the substrate surface and provides a bright, fast, appealing red or yellow color depending on the pigment used.

In addition, the pigmented inks of the invention exhibit excellent opacity when screened onto dark colored substrates even when using very free mesh screens (310 to 320 mesh). When normal inorganic-based printing inks are silk screened onto dark colored substrates, usually two to three applications am necessary because the ink is not sufficiently opaque and the black plastic will show through. In these cases decorators will often fast screen white indicia onto the dark colored container and screen the colored ink over it to achieve the appropriate coloration. Most unexpectedly the organic-based inks of the invention exhibit color which is equivalent, if not better than, what is achieved through multiple applications of traditional inorganic pigment inks. Even when using very fine screens, the inks of the invention exhibit excellent opacity on dark colored substrates, mandating only one application. This results in considerable time and cost savings.

In another embodiment of the invention, it is possible to provide a decorated substrate which has a two-tone effect where a potion of the colored ink on the substrate is hot stamped. For example, a substrate such as a container may be decorated in a pre-determined design by silk screening the ink composition on the substrate and curing with electron beam or the appropriate radiation. A layer of hot stamping for is then compressed against the substrate with a press which is heated to a temperature sufficient to cause the hot stamping for to adhere to the printed ink design but not to the ink-free areas of the glass. Hot stamping foil is generally laminate comprised of a carrier material (often polyester or a similar material capable of release), a release film between the carrier and a subsequent decorative coat which is usually color or a metallized coat, most often aluminum or colored aluminum. The foil may contain other optional layers such as one or more protective layers, hot melt adhesive layers, etc. between the metallized layer or layers and the carrier material. More specifically, hot stamping foil can be defined as a multilayer web comprised of a backing film carrier, a release coating, one or more protective top coatings, one or more color coatings, and a hot melt adhesive, in that order. The hot stamping foil is then compressed against the container with the hot melt adhesive layer being compressed against the substrate. The compress, which may be a standard hot stamping press or a hand held press, is heated to a temperature sufficient to cause the hot melt adhesive layer of the hot stamping foil to adhere to the ink decorated portion of the substrate. Generally this temperature ranges from about 250°–400° F. Temperatures higher than this will cause deterioration of the hot stamping foil or some decomposition of the ink. The application of heat causes the adhesive side of the hot stamping foil to become adhesively adhered to the ink design but not to the ink-free areas of the substrate. When the compress is removed, a portion of the foil laminate adheres to the ink decoration but not to the ink free areas of the glass. In particular, adhered to the colored ink design on the substrate is the hot melt adhesive layer, the color coatings, and the protective top coatings, in that order, of the hot stamping foil. Portions of the release coating may or may not be adhered to the protective top coating because the release coating is designed to melt upon application of heat and cause the polyester carrier backing layer to release from the protective top coat layer and some remnants may remain.

The colored ink design on the substrate can be fully or partially hot stamped as desired to yield a pleasant two-tone metallic/color design on the substrate. In addition, when the substrate is plastic, the ink design can be applied and cured and the hot stamping foil can be applied to any area of the container, including the ink design, with the heated die because the relatively low melting point of plastic permits direct adhesion of hot stamping foil to the plastic without the necessity of an intermediate ink layer.

The invention will be further described in connection with the following examples which are set forth for the purposes of illustration only.

EXAMPLE 1

A colored ink composition in accordance with the invention was made as follows:

|  | Grams | w/w % |
| --- | --- | --- |
| Cyracure UVR 6110 (Union Carbide) | 50.00 | 50.63 |
| Polyol 310 (Union Carbide) | 6.25 | 6.33 |
| Cyracure UVI 6974 | 5.00 | 5.06 |
| BYK-053 (Union Carbide) | 7.5 | 7.59 |
| Irgazan Red DPP 80 (Ciba Geigy) | 25.00 | 25.32 |
| Irgazan Yellow 2GLTE (Ciba Geigy) | 5.00 | 5.07 |

The first three ingredients were mixed together and the pigments added. The ink was transferred to a glass container using a silk screen process. The glass container was subjected UV radiation for approximately 5 minutes to effect curing. The cured ink was a rich red color, exhibited a smooth surface without irregularities, and adhered well to the glass.

EXAMPLE 2

A colored ink composition in accordance with the invention was made as follows:

|  | Grams | w/w % |
| --- | --- | --- |
| Cyracure UVR 6110 (Union Carbide) | 50.00 | 50.63 |
| Polyol 310 (Union Carbide) | 6.25 | 6.33 |
| Cyracure UVI 6974 | 5.00 | 5.06 |
| BYK-053 (Union Carbide) | 7.5 | 7.59 |
| Irgazan Yellow 2GLTE (Ciba Geigy) | 30.00 | 30.39 |

The first three ingredients were mixed together and the pigments added. The ink was transferred to a glass container using a silk screen process. The glass container was subjected UV radiation for approximately 5 minutes to effect curing. The cured ink was a brilliant yellow, exhibited a smooth surface without irregularities, and adhered well to the glass.

EXAMPLE 3

A red ink composition was made in accordance with the invention as follows:

|  | Grams | w/w % |
| --- | --- | --- |
| Cyracure UVR 6110 (Union Carbide) | 50.00 | 50.63 |
| Polyol 310 (Union Carbide) | 6.25 | 6.33 |
| Cyracure UVI 6974 | 5.00 | 5.06 |
| BYK-053 (Union Carbide) | 7.5 | 7.59 |
| Irgazan Red DPP 80 (Ciba Geigy) | 30.00 | 30.39 |

The first three ingredients were mixed together and the pigments added. The ink was transferred to a black plastic (polyethylene) container using a silk screen of 320 fibers per inch having imprinted indicia thereon. The container was subjected UV radiation in a 300 watt/minute UV conveyer for approximately 5 minutes to effect curing. The cured ink was a deep red, exhibited a smooth surface without irregularities, and adhered well to the container. In addition, the red ink was opaque over the black plastic and exhibited a true red color.

EXAMPLE 4

The ink composition of Example 1 was applied to a glass bottle with a silk screen having a 255 line (255 fibers/square inch) screen with a decorative design imprinted on it. The ink decorated bottle was subjected to LTV radiation in a 300 watt/30 feet per minute UV conveyer for 7 minutes to effect curing. Gold hot stamping foil (Crown Royal Leaf, Paterson, N.J.) was compressed against the portion of the container decorated with a die heated to 250° F. for several seconds. After removal of the die the release layer of the hot stamping foil laminate released the backing film carrier leaving the metallic laminate portion of the foil adhered to the cured ink design, giving a metallic gold appearance.

EXAMPLE 5

The ink composition of Example 1 was used to hand paint a floral design onto a clear polyethylene plastic container using a fine tip sable brush. The container was subjected to UV radiation for a period of 5 minutes by passing through a 300 watt/30 feet per minute UV conveyer. The ink design cured smoothly and was a rich, deep red.

EXAMPLE 6

The ink composition of Example 1 was silk screened onto a black colored plastic polyethylene bottle using a 255 line (255 fibers/square inch) screen with a rose design imprinted on it. The bottle was subjected to UV curing by passing through a 300 watt/30 feet per minute UV conveyer for 8 minutes. The ink rose design was deep red in color. Next, the rose design was preferentially hot stamped by compressing a layer of gold hot stamping foil against the rose with a heated die having a design which, when compressed against the rose design in exact registration, provides a rose which has petals tipped in gold. The die was heated to approximately 300° F. and the hot stamping foil was compressed against the rose design for approximately several seconds to effect registration. The rose design adhered permanently to the container and was suitable for commercial use.

EXAMPLE 7

A colored ink composition was made as follows:

55 grams Ebecryl 6700 (aromatic urethane methacrylkate) Padcure Specialties, Atlanta Ga.

20 grams 302 tetrahydrofurfuryl acrylate (Sartomer, Exton Pa.)

20 grams 506 isobornyl acrylate #506 (Sartomer)

0.5 grams BYK-052

5.0 grams Irgacure 25 grams Irgazan Red DPP 80

5 grams Irgazan Yellow 2GLTE

The first four ingredients were mixed together and the pigments added. The ink was transferred to a glass container using a silk screen process. The glass was subjected to UV radiation for approximately 8 minutes to effect curing. The cured ink was a rich red color and exhibited a smooth surface without irregularities.

EXAMPLE 8

An ink composition was prepared as follows:

27 grams urethane methacrylate 55 parts high boiling methacrylate resin
5 parts acrylic acid
5 parts hydroxyethylmethacrylate
5 parts photoinitiator
3 parts silane
25 parts Irgazan Red DPP 80.

The resulting ink composition was applied to a clear polyethylene plastic container and cured by subjecting to UV radiation for 5 minutes. The ink was bright red and adhered well to the container.

While the invention has been described in connection with the preferred embodiment, it is not intended to limit the scope of the invetnion to the particular form set forth, but, on the contrary, it is intended to cover such alternatives, modifications, and equivalents as may be included within the spirit and scope of the invention as defined by the appended claims.

We claim:

1. An ultraviolet radiation curable pigmented composition comprising:
   a) an ultraviolet radiation curable component which, when applied directly to a substrate, is operable, when cured, to bond to the substrate, and
   b) a pigment selected from the group consisting of pyrrolopyrrol, isoindolinone, and mixtures thereof.

2. The pigmented ink composition of claim 1 comprising 10–95% by weight of the ultraviolet radiation curable component.

3. The pigmented ink composition of claim 2 comprising 1–50% by weight of pigment.

4. The pigmented ink composiiton of claim 3 wherein the ultraviolet radiation curable component is a monomer or polymer having a molecular weight below 50,000.

5. The pigmented ink composition of claim 6 wherein the ultraviolet radiation curable component is a monomer.

6. The pigmented ink composition of claim 5 wherein the monomer is epoxide, cycloaliphatic epoxide, vinyl chloride, styrene, ethyl acrylate, vinyl acetate, hydroxy alkyl acrylate, hydroxy alkyl methacrylate, vinyl butyrate, vinyl methyl ether, methyl methacrylate, isobornyl acrylate, acrylonitrile, or mixtures thereof.

7. The pigmented ink composition of claim 6 wherein the monomer is a cationally UV-cured cycloaliphatic epoxide.

8. The pigmented ink composition of claim 7 wherein the pigment is selected from the group consisting of a pyrrolopyrrol of the formula:

wherein $R_1$ and $R_2$ are each independently alkyl, arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl, phenyl, benzoyl, benzyl, arylalkyl, aryl, alkanoyl, $C_{5-6}$ cycloalkyl, alkenyl, alkynyl, carbamoyl, alkylcarbamoyl, arylcarbamoyl, or alkoxycarbonyl; and X is O or S; an isoindolinone which is a tetrachlorocyanobenzoic alkyl ester, and mixtures thereof.

9. The pigmented ink composition of claim 1, additionally comprising 1–20% by weight of an ester containing polyol.

10. The pigmented ink composition of claim 9 wherein the ester containing polyol is a reaction product of a polycarboxylic acid and polyol.

11. The pigmented ink composition of claim 10 wherein the ester containing polyol is a polycaprolactone polyol.

12. The pigmented ink composition of claim 1 additionally comprising 3–15% of a photoiniating agent.

13. The composition of claim 12 wherein the ink composition comprises:
   15–40% of a pigment selected from the group consisting of isoindolinone, pyrrolopyrol, and mixtures thereof,
   35–85% of a cationically UV curable cycloaliphatic epoxide,
   3–15% of a photoinitiator which is a triarylsulphonium salt
   1–20% of a polyvinylbutyl ether defoaming agent
   3–15% of a polycaprolactone polyol.

14. The pigmented ink composition of claim 13 wherein the pigment is selected from the group consisting of pyrrolo 3,4-C pyrrol-1,4-dione,2,5-dihyro-3,6-di-4-chorophenyl; tetrachlorocyanobenzoic acid ester and mixtures thereof.

15. The pigmented ink composition of claim 14 wherein the cationically cured cycloaliphatic epoxide is selected from the group constiting of 3,4-epoxycyclohexylmethyl-3,4, epoxycyclohexane carboxylate, bis-(3,4-epoxy-cyclohexylmethyl)-adipate, vinylcyclohexene diepoxide, bis (2,30epoxycyclophenyl)ether, 2,3-epoxy-2-methylcyclohexyl-methyl-3,4-epoxy-2-methylcyclohexane carboxylate, and mixtures thereof.

16. The pigmented ink composition of claim 12 wherein the polycaprolactone polyol is trimethylcaprolactone.

17. A substrate having an inner surface and an outer surface wherein the outer surface has bonded thereto a pigmented ink composition comprised of a radiation cured component and a pigment selected from the group consisting of pyrrolopyrrol, isoindolinone, and mixtures thereof, which pigmented ink composition covers less than all of said outer surface.

18. The substrate of claim 17 which is glass.

19. The substrate of claim 18 selected from the group consisting of a beverage bottle and a cosmetic bottle.

20. The substrate of claim 18 wherein the radiation cured component is a cycloaliphatic epoxide.

* * * * *